United States Patent [19]

Krishnan et al.

[11] Patent Number: 5,575,843
[45] Date of Patent: Nov. 19, 1996

[54] PROCESS FOR IMPROVING COLOR VALUE OF A PIGMENT

[75] Inventors: Ramasamy Krishnan, Colonia; Marilyn C. Yamat, Bogota, both of N.J.; Manuel Z. Gregorio; Russell J. Schwartz, both of Cincinnati, Ohio

[73] Assignee: Sun Chemical Corporation

[21] Appl. No.: 357,684

[22] Filed: Dec. 16, 1994

[51] Int. Cl.$^6$ .................................................. C09B 63/00
[52] U.S. Cl. .................... 106/402; 106/493; 106/496; 106/23 K
[58] Field of Search .................... 106/496, 402, 106/493, 23 K

[56] References Cited

U.S. PATENT DOCUMENTS

| | | | |
|---|---|---|---|
| 3,778,287 | 12/1973 | Stansfield et al. | 106/496 |
| 4,196,016 | 4/1980 | Simon | 106/496 |
| 5,352,281 | 10/1994 | Weide et al. | 106/20 R |
| 5,366,546 | 11/1994 | McCrae et al. | 106/496 |
| 5,380,363 | 1/1995 | Coispeau et al. | 106/496 |

OTHER PUBLICATIONS

Walter Kurtz–Organic Pigments for Printing Inks pp. 20–42, American Ink Maker Dec. 1986.

Primary Examiner—Mark L. Bell
Assistant Examiner—Scott L. Hertzog
Attorney, Agent, or Firm—Jack Matalon

[57] ABSTRACT

A process for improving the color value of a pigment and for imparting stability to a water-based printing ink containing such pigment which comprises adding a polyester or polyether to the strike tank during the pigment conditioning step; the preferred polyether is methyl hydroxypropyl cellulose and the preferred polyester is benzoic acid-modified trimellitic anhydride polyester.

15 Claims, No Drawings

PROCESS FOR IMPROVING COLOR VALUE OF A PIGMENT

FIELD OF THE INVENTION

The invention relates to a process for improving the color value of a pigment; the resultant pigment also exhibits increased stability in water-based printing inks.

BACKGROUND OF THE INVENTION

The conventional process for preparing a pigment involves four steps: (a) diazotizing an aromatic monoamine or diamine, (b) coupling a substituted or unsubstituted naphthol or an acetoacetylated aromatic monoamine with the diazotized aromatic monoamine or diamine, (c) conditioning the reaction mixture to induce crystallization of the pigment and (d) recovering the crystallized pigment from the conditioned reaction mixture.

Conventionally-produced pigments are quite satisfactory for use in solvent-based inks, and it is well-known in the prior art to incorporate one or more surfactants during the conditioning step to aid in the dispersion of the pigments, to reduce the grind sensitivity of dried pigment preparations, etc., see U.S. Pat. No. 5,352,281.

Environmental pressures are causing printers to phase out the use of solvent-based inks and to substitute water-based inks in their stead. However, the color value of a pigment in a water-based ink and the gloss and density of such ink are generally lower than that obtained in a solvent-based ink containing such pigment.

The problems alluded to above are especially prevalent when the pigment is a barium- or calcium-laked pigment or a diarylide pigment. For example, efforts are known in the prior art to replace all or part of the calcium ions in a laked pigment with ions of heavier atoms. While such approach appears to reduce the instability problem, the resultant pigment is more extended which leads to greatly reduced efficiency.

It is also known to employ electrostatic and steric stabilization approaches. In the former case, a sufficiently high charge density is induced by adsorbing ionic surfactants which then prevents close approach of the pigment particles. In the latter case, adsorption of a polymer onto the surface of the pigment particle prevents agglomeration.

SUMMARY OF THE INVENTION

It has now been found that the addition of a polyether and/or a polyester to the reaction mixture during the pigment conditioning step results in a pigment having greatly enhanced color value. Moreover, water-based inks containing pigments treated in such manner exhibit increased stability, gloss and density in comparison to water-based inks containing pigments not treated in accordance with the process of the invention.

DETAILS OF THE INVENTION

The present invention relates to an improvement in the conventional process for preparing pigments. The conventional process consists of four basic steps:

(a) diazotization of an aromatic monoamine or diamine;

(b) coupling a substituted or unsubstituted naphthol or an acetoacetylated aromatic monoamine with the diazotized aromatic monoamine or diamine;

(c) conditioning the reaction mixture to induce crystallization of the pigment; and (d) recovering the crystallized pigment from the conditioned reaction mixture.

The improvement in the conventional pigment preparation process involves the addition of a polyether and/or polyester to the reaction mixture during the conditioning step. Generally, the polyether and/or polyester will have a weight average molecular weight of about 2,000 to 15,000, preferably 9,000 to 12,000. Suitable polyethers include hydroxypropyl cellulose and methyl hydroxypropyl cellulose. The preferred polyether comprises methyl hydroxypropyl cellulose. Suitable polyesters include benzoic acid-modified trimellitic anhydride polyester which has the idealized structure indicated below:

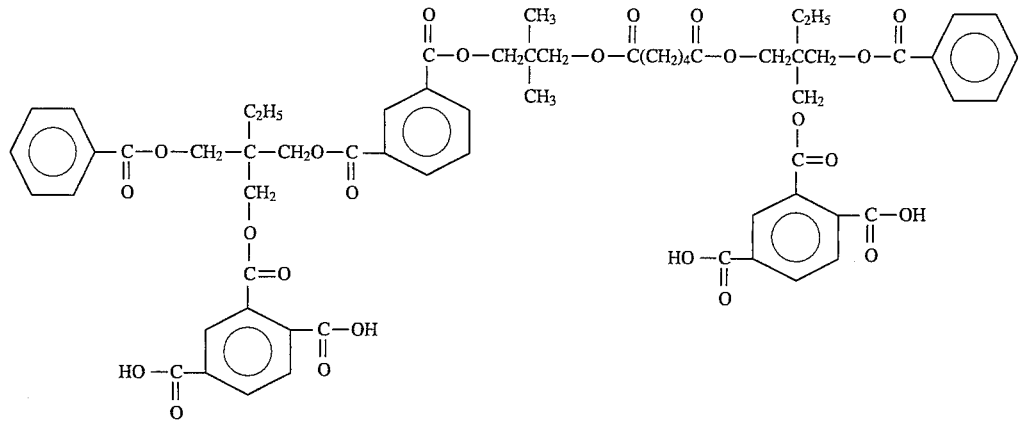

Typically, the polyether and/or polyester will be utilized in amounts of about 3–12 wt. %, preferably 5–9 wt. %, based on the weight of the pigment expected to result from the coupling step.

Preferably the pigment comprises a barium-laked or calcium-laked pigment or a diarylide yellow pigment. Preferable laked pigments include CI Pigment Red 48:1, CI Pigment Red 48:2, CI Pigment Red 49:1, CI Pigment Red 49:2, CI Pigment Red 52:1, CI Pigment Red 52:2, CI Pigment Red 53:1, CI Pigment Red 53:2, CI Pigment Red 57:1, CI Pigment Red 57:2, CI Pigment Red 63:1 and CI Pigment Red 63:2.

Preferable diarylide yellow pigments include CI Pigment Yellow 12, CI Pigment Yellow 13, CI Pigment Yellow 14, CI Pigment Yellow 17, CI Pigment Yellow 55, CI Pigment Yellow 81, CI Pigment Yellow 83, CI Pigment Yellow 113, CI Pigment Yellow 114, CI Pigment Yellow 126 and CI Pigment Yellow 127.

As is customary, rosins and surfactants (cationic, anionic and/or nonionic) may be added during the course of the coupling step and/or the conditioning step. Typically, the conditioning step is carried out at a temperature of about 25° to 100° C., preferably 70° to 90° C., for a period of time ranging from 10 to 120 minutes, preferably 15 to 60 minutes, depending on the batch size of the pigment. The polyether and/or polyester is gradually added over a 2 to 10 minute period of time to the reaction mixture resulting from the coupling reaction.

In the final step, i.e. step (d), the pigment is isolated from the aqueous slurry by filtration, thus yielding a wet presscake having a pigment solids content typically in the range of 15–50 wt. %. The pigment particle size will generally be in the range of 0.30 to 0.65μ as measured by light scattering.

The wet presscake may then be converted into a water-based ink by conventional dispersion techniques, e.g. dispersion of the wet presscake into an appropriate water varnish by power mixing or milling, or by drying the pigment and thereafter grinding it into the varnish or by mixing of a pigment water paste with the varnish.

The formulation of a water-based ink will depend somewhat on the desired ink application, i.e. gravure printing, corrugated printing, flexographic printing, etc. A typical water-based ink will contain 5.0 to 7.5 wt. %, based on the weight of the finished ink, of a pigment prepared in accordance with the process of the invention. Other ingredients typically found in water-based inks and the wt. % amounts employed (based on the weight of the finished ink) are: 1.5 to 2.5 wt. % of an alkali or amine, 25 to 40 wt. % of a water soluble or water-reducible resin such as an acrylic or polyester resin, 2.5 to 3.0 wt. % polyethylene wax compound, 0 to 5.0 wt. % isopropyl alcohol, 40 to 60 wt. % water, 1.0 to 3.0 wt. % of one or more surfactants, 0.05–0.2 wt. % silicone antifoam, etc.

The following nonlimiting examples shall serve to illustrate this invention; unless otherwise indicated, all parts and percentages are by weight.

EXAMPLE 1

CI Pigment Red 57:1 (i.e. Lithol Rubine 4B, calcium salt) was prepared in accordance with the procedure set forth below.
BONA Solution 41.5 g BONA (i.e. 3-hydroxy-2-naphthoic acid) and 42.0 g 50% NaOH were added to 1,000 ml water at a temperature of 40° C. and stirred until dissolution occurred. The volume was then adjusted to 2,250 ml with water and the solution was chilled to 0° C.
ROSIN Solution 12.1 g wood rosin and 5.8 g 50% NaOH were added to 250 ml water and heated to 90° C. and stirred until a clear solution resulted. The solution was then cooled to 30° C.
DIAZO Solution 1.8 g o-naphthionic acid (i.e. 1-aminonaphthalene-2-sulfonic acid), 2.5 g "Lomar PW" (i.e. sodium salt of condensed mono-naphthalene sulfonic acid) and 17.8 g 50% NaOH were added to 600 ml water and heated to 60° C. and stirred until dissolution occurred. Thereafter, 35.4 g 4B Acid (i.e. p-toluene-m-sulfonic acid) were added and stirred until dissolution occurred. The solution was cooled to −2° C. and the volume adjusted to 950 ml with water. 40.4 g 38.5% NaNO$_2$ solution were added and the solution stirred for 1 minute. 60.5 g Hcl (20° Be) were added and the solution was stirred for 5 minutes at 0° C.

The pigment was then prepared in accordance with the following steps:

1. The DIAZO solution was added to the BONA solution over 2–3 minutes; the pH was in the range of 11.0–11.5 at a temperature of 0° to 5° C. The solution was then stirred for 30 minutes and tested for complete coupling (there should be no excess diazo).
2. The ROSIN solution was added to the solution from step 1 over 2–3 minutes and stirring continued for 15 minutes; the pH was in the range of 11.0–11.5.
3. 109.0 g calcium chloride solution (29%) were added and stirred for 15 minutes; the pH was in the range of 10.0–10.5.
4. The reaction mixture resulting from step 3 was then heated to 25° C. and stirring continued for 60 minutes.
5. The pH was adjusted to 9.8–10.2 and the reaction mixture was maintained at 85° C. for 15 minutes and then cooled to 70° C.
6. 25.5 g aluminum chloride solution (28%) were added to the reaction mixture over 15 minutes while maintaining a pH in the range of 6.0–6.5; the reaction mixture was then stirred for 10 minutes at 60°–65° C.
7. 375 g methyl hydroxypropyl cellulose solution (2%) were added slowly over 5 minutes. The reaction mixture was then stirred for 10 minutes at 55°–60° C.; the pH at this point was 6.0–6.5.
8. The pigment was then filtered from the reaction mixture and washed with warm water until a neutral pH was obtained. The pigment was found to have a particle size of 0.5951μ as measured by light scattering.

EXAMPLE 2

Example 1 was repeated, except that step 7 involving the addition of methyl hydroxypropyl cellulose was omitted. The pigment was found to have a particle size of 0.7969μ as measured by light scattering.

EXAMPLE 3

Pigment dispersions prepared from the pigments obtained in Examples 1 and 2. Each dispersion was prepared from the following components: 18.0 g pigment, 8.0 g "Joncryl 67" acrylic resin, 7.05 g NH$_4$OH (30% solution) and 66.95 g water. The dispersion prepared with the pigment of Example 1 was 12.5% stronger in color strength than that of the dispersion prepared with the pigment of Example 2.

EXAMPLE 4

CI Pigment Yellow 12 (i.e. Diarylide Yellow AAA) was prepared in accordance with the procedure set forth below.
Tetrazo Solution 35.4 g dichlorobenzidine and 65.0 g hydrochloric acid (20° Be) were added to 200 ml water and the mixture was stirred for 30 minutes and then cooled to −2° C. Thereafter, 51.4 g sodium nitrite (35% aqueous solution) were added, with stirring; the reaction mixture was then stirred for 45 minutes while maintaining a temperature of 0° to 3° C. Sulfamic acid was added to remove any excess nitrite and the volume was adjusted to 500 ml with water while maintaining a temperature of 0° C.

Coupling Component 50.8 g acetoacetanilide and 64.0 g NaOH (50%) were added to 400 ml water and stirred until dissolved. The volume was then adjusted to 1800 ml with water and the temperature was lowered to 10° C. Thereafter, 72.0 g acetic acid (70%) were added and the pH was in the range of 6.0–6.2; the volume was then adjusted to 2000 ml with water and the temperature of the solution was increased to 15° C. The pigment was then formed in accordance with the following steps:

1. The Tetrazo Solution was slowly added to the Coupling component over 60 minutes while maintaining the pH at 4.0–4.2 and the temperature at 15°–20° C. The reaction mixture was checked for complete coupling (no excess tetrazo) and for a pH in the range of 4.0–4.2
2. A surfactant of the type and amount indicated below was then added to the reaction mixture resulting from step 1. The pigment slurry was heated to 90° C. and maintained at such temperature for 15 minutes; it was thereafter cooled to 60° C.
3. The pigment was then filtered from the reaction mixture and washed with warm water until a neutral pH was obtained. The yield was 94.6 g.

Pigment #53-A was prepared using an anionic surfactant of the azomethine type (a polyether amide) in an amount of 18 wt. %, based on the weight of the pigment, in step 2 of the above process. Pigment #54-A was prepared using 5 wt. %, based on the weight of the pigment, an anionic surfactant consisting of an aluminum salt of a substituted sulfonic acid in step 2 of the above process. Pigment #55-A was prepared using 20 wt. %, based on the weight of the pigment, of a nonionic surfactant consisting of a propylamino anilide, in step 2 of the above process.

EXAMPLE 5

Example 4 was repeated but the following step was carried out between steps 2 and 3 of the process:

330 g methyl hydroxypropyl cellulose solution (2%) were added slowly over 5 minutes. The reaction mixture was then stirred for 10 minutes at 55°–60° C.

For the purposes of Table III below, pigments 53-B, 54-B and 55-B were prepared using the above additional step as well as the surfactants corresponding to those employed in preparing pigments 53-A, 54-A and 55-A.

EXAMPLE 6

Pigment dispersions and printing inks were prepared from pigments 53-A, 54-A, 55-A and 53-B, 54-B and 55-B in accordance with the following formulations:

TABLE I

DISPERSION

| Component | Amount, g |
|---|---|
| Pigment (53-A, 54-A, 55-A, 53-B, 54-B or 55-B) | 35.0 |
| "Joncryl 67"[1] | 8.75 |
| Ammonium Hydroxide (30% Solution) | 7.00 |
| "Proxcel CRL"[2] | 0.10 |
| Water | 49.15 |

[1] A high molecular weight acrylic resin which yields high viscosities in water-based inks obtained from S. C. Johnson & Son, Inc., Racine, WI
[2] A solution (30%) of 1,2-benzisothiazolin-3-one in aqueous ethylene diamine obtained from ICI Americas Inc., Wilmington, DE

TABLE II

PRINTING INK

| Component | Amount, g |
|---|---|
| Dispersion from above | 20.0 |
| Water | 12.0 |
| "SMA 1538"[3] | 8.0 |
| "Joncryl 89"[4] | 59.1 |
| "Foamaster RD"[5] | 0.5 |
| "Vanchem NATD"[6] | 0.2 |
| "Proxcel GXL"[7] | 0.2 |

[3] An ammoniacal solution of a low molecular weight styrene-maleic anhydride resin obtained from Atochem, Channelview, TX
[4] A styrenated acrylic dispersion (48% solids) obtained from S. C. Johnson & Son, Inc., Racine, WI
[5] A defoamer obtained from Henkel Corp., Ambler, PA
[6] A 30% aqueous solution of disodium 2,5-dimercapto-thiadiazole obtained from R. T. Vanderbilt Company, Inc., Norwalk, CT
[7] A solution (19%) of 1,2-benzisothiazolin-3-one in aqueous dipropylene glycol obtained from ICI Americas Inc., Wilmington, DE The printing inks formulated as set forth above were evaluated for physical properties and printability. As may be seen from the results set forth in Table III below, the ink prepared with the nonionic surfactant and the methyl hydroxypropyl cellulose (#53-B) exhibited the best printability in terms of gloss and density.

TABLE III

| INK CHARACTERISTICS | | PIGMENT IDENTIFICATION | | | | | |
|---|---|---|---|---|---|---|---|
| I. PRINT DRAWDOWN ON SOLID TONE | | 53-A | 53-B | 54-A | 54-B | 54-A | 54-B |
| SINGLE | GLOSS | 14.8 | 16.5 | 14.6 | 15.9 | 12.7 | 17.2 |
| COLOR | DENSITY | 0.89 | 0.94 | 0.88 | 0.95 | 0.87 | 0.96 |
| TRAP | GLOSS | 19.7 | 22.6 | 20.4 | 20.6 | 20.2 | 21.4 |
| | DENSITY | 1.21 | 1.31 | 1.27 | 1.28 | 1.21 | 1.27 |
| II. CUT INK (DILUTION RATIO = 30) pH | | 8.28 | 8.76 | 8.20 | 8.81 | 8.29 | 8.26 |
| CONDUCTIVITY | | 5900 | 5180 | 5980 | 5920 | 6150 | 5760 |
| VISCOSITY (@ 20° C.) ZAHN #2 (sec) | | 15.16 | 21.09 | 14.36 | 20.08 | 15.52 | 18.98 |
| HAAKE (tau max) | | 0.63 | 1.10 | 0.75 | 0.99 | 0.53 | 1.10 |

EXAMPLE 7

An aqueous publication gravure ink was prepared from a standard pigment (CI Pigment Red 57:1) in which no methyl hydroxypropyl cellulose was added during the pigment synthesis process. A second ink was prepared from the same standard pigment to which methyl hydroxypropyl cellulose was post-added to the ink formulation. The second ink exhibited no improvement in printability over the first ink and the color strengths of both inks were equal.

What is claimed is:

1. In a process for preparing a pigment which comprises the steps of (a) diazotizing an aromatic monoamine or diamine, (b) coupling a substituted or unsubstituted naphthol or an acetoacetylated aromatic monoamine with the diazotized aromatic monoamine or diamine, (c) conditioning the reaction mixture to induce crystallization of the pigment and (d) recovering the crystallized pigment from the conditioned reaction mixture, the improvement which comprises adding a polymer selected from the group consisting of polyethers and polyesters to the reaction mixture during the conditioning step.

2. The process of claim 1 wherein the polymer has a weight average molecular weight of about 2,000 to 15,000.

3. The process of claim 1 wherein the polymer comprises methyl hydroxypropyl cellulose.

4. The process of claim 1 wherein the polymer comprises benzoic acid-modified trimellitic anhydride polyester.

5. The process of claim 1 wherein the polymer comprises a mixture of methyl hydroxypropyl cellulose and benzoic acid-modified trimellitic anhydride polyester.

6. The process of claim 1 wherein the pigment comprises a barium-laked or calcium-laked pigment.

7. The process of claim 6 wherein the pigment is selected from the group consisting of CI Pigment Red 48:1, CI Pigment Red 48:2, CI Pigment Red 49:1, CI Pigment Red 49:2, CI Pigment Red 52:1, CI Pigment Red 52:2, CI Pigment Red 53:1, CI Pigment Red 53:2, CI Pigment Red 57:1, CI Pigment Red 57:2, CI Pigment Red 63:1 and CI Pigment Red 63:2.

8. The process of claim 1 wherein the pigment comprises a diarylide yellow pigment.

9. The process of claim 8 wherein the pigment is selected from the group consisting of CI Pigment Yellow 12, CI Pigment Yellow 13, CI Pigment Yellow 14, CI Pigment Yellow 17, CI Pigment Yellow 55, CI Pigment Yellow 81, CI Pigment Yellow 83, CI Pigment Yellow 113, CI Pigment Yellow 114, CI Pigment Yellow 126 and CI Pigment Yellow 127.

10. The process of claim 1 wherein the polymer is utilized in an amount of 3 to 12 wt. %, based on the weight of the pigment.

11. The process of claim 1 wherein the pigment recovered from the reaction mixture has a particle size of 0.30 to 0.65μ.

12. A water-based printing ink containing a pigment prepared by the process of claim 1.

13. The printing ink of claim 12 wherein the pigment is present in an amount of about 3–10 wt. %, based on the weight of the ink.

14. The printing ink of claim 12 wherein the pigment comprises a barium- or calcium-laked pigment.

15. The printing ink of claim 12 wherein the pigment comprises a diarylide yellow.

* * * * *